April 25, 1967 G. SIVIY ETAL 3,316,366
OPERATING MECHANISMS FOR ELECTRIC SWITCH STRUCTURES
Filed Feb. 11, 1965 6 Sheets-Sheet 1

FIG.1.

WITNESSES
Theodore F. Wrobel
James F. Young

INVENTORS
George Siviy
and Victor F. Sobol
BY
Clement L. McHale
ATTORNEY

United States Patent Office 3,316,366
Patented Apr. 25, 1967

3,316,366
OPERATING MECHANISMS FOR ELECTRIC SWITCH STRUCTURES
George Siviy and Victor F. Sabol, Monroeville, Pa., assignors to Westinghouse Electric Corporation, Pittsburgh, Pa., a corporation of Pennsylvania
Filed Feb. 11, 1965, Ser. No. 431,908
5 Claims. (Cl. 200—48)

This invention relates to electric switches and, more specifically, to operating mechanisms for switches particularly suitable for use as grounding switches.

In electric power systems, high voltage disconnecting switches are employed to isolate transmission lines and high voltage electrical apparatus in order to permit the inspection or repair of such apparatus or for other reasons. In order to prevent injury to maintenance or operating personnel in the event that the apparatus should be inadvertently re-energized, it is common practice to provide auxiliary grounding switches to ground the transmission line and thus, to drain off any static charge that may remain after an isolating operation of the high voltage disconnecting switch. As the voltage ratings and sizes of high voltage disconnecting switches increase, the corresponding sizes of the associated grounding switches also increase and a problem arises in providing such grounding switches due to the increased operating forces required to actuate such grounding switches, particularly under severe icing conditions. The problem of increased operating forces is additionally aggravated where the grounding switch is to be of the manually operated type. An additional problem may arise in providing a suitable grounding switch for use with certain types of high voltage disconnecting switches, such as those of the center break type in which a pair of cooperating switch blades are mounted on independent insulating supports which are simultaneously rotated when the switch is opened and closed. If one of the contacts of a grounding switch associated with a disconnecting switch of the center break type is mounted on one of the insulating supports of the associated disconnecting switch and rotated into position to be engaged by a pivotal blade of the grounding switch only when the disconnecting switch is in the open position, an alignment problem may arise if the contact member of the grounding switch is not precisely actuated to the proper position to receive the associated blade of the grounding switch. It is therefore desirable to provide an improved grounding switch structure in which the operating force required to actuate the grounding switch is reduced and which is uniquely adapted for use with high voltage disconnecting switches of the center break type.

It is an object of this invention to provide a new and improved grounding switch.

Another object of this invention is to provide an improved operating mechanism for a switch of the blade type having a rotatable operating shaft.

A further object of this invention is to provide an improved contact structure for a switch having separable contacts which move sequentially in a contact closing operation.

A still further object of this invention is to provide an improved means for reducing the torque or force required to operate a switch having a switch blade of substantial weight or length.

Other objects of the invention will, in part, be obvious and will, in part, appear hereinafter.

For fuller understanding of the nature and objects of the invention, reference should be had to the following detailed description taken in conjunction with the accompanying drawings in which.

Referring now to the drawings and FIGS. 1 through 5 in particular, the structure shown therein comprises a high voltage disconnecting switch assembly 40 and a grounding switch 20, which, as illustrated, may be of the manually operated type. The disconnecting switch 40 may be of the type described in greater detail in our co-pending application Ser. No. 244,147, filed Dec. 12, 1962, which issued Aug. 17, 1965 as U.S. Patent 3,201,535 and which is assigned to the same assignee as the present invention.

Figure 1:
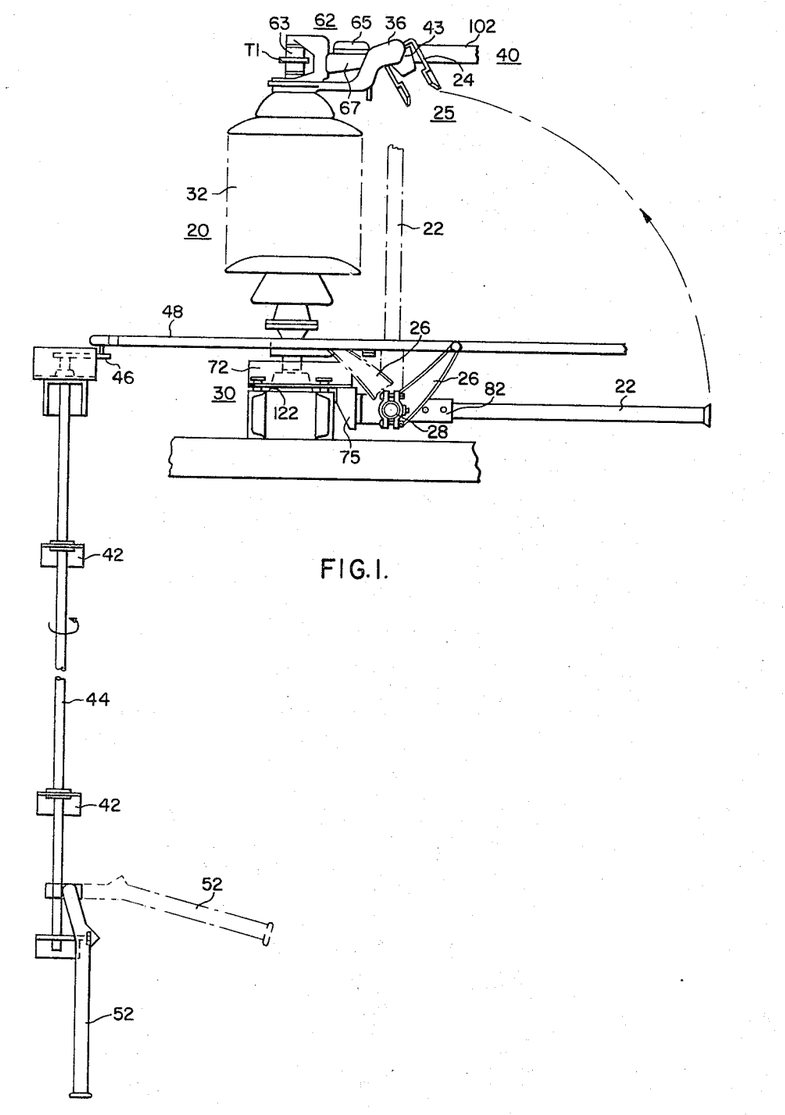
FIGURE 1 is a view, in side elevation, of a grounding switch embodying the principal features of the invention in the open position.
Figure 3:
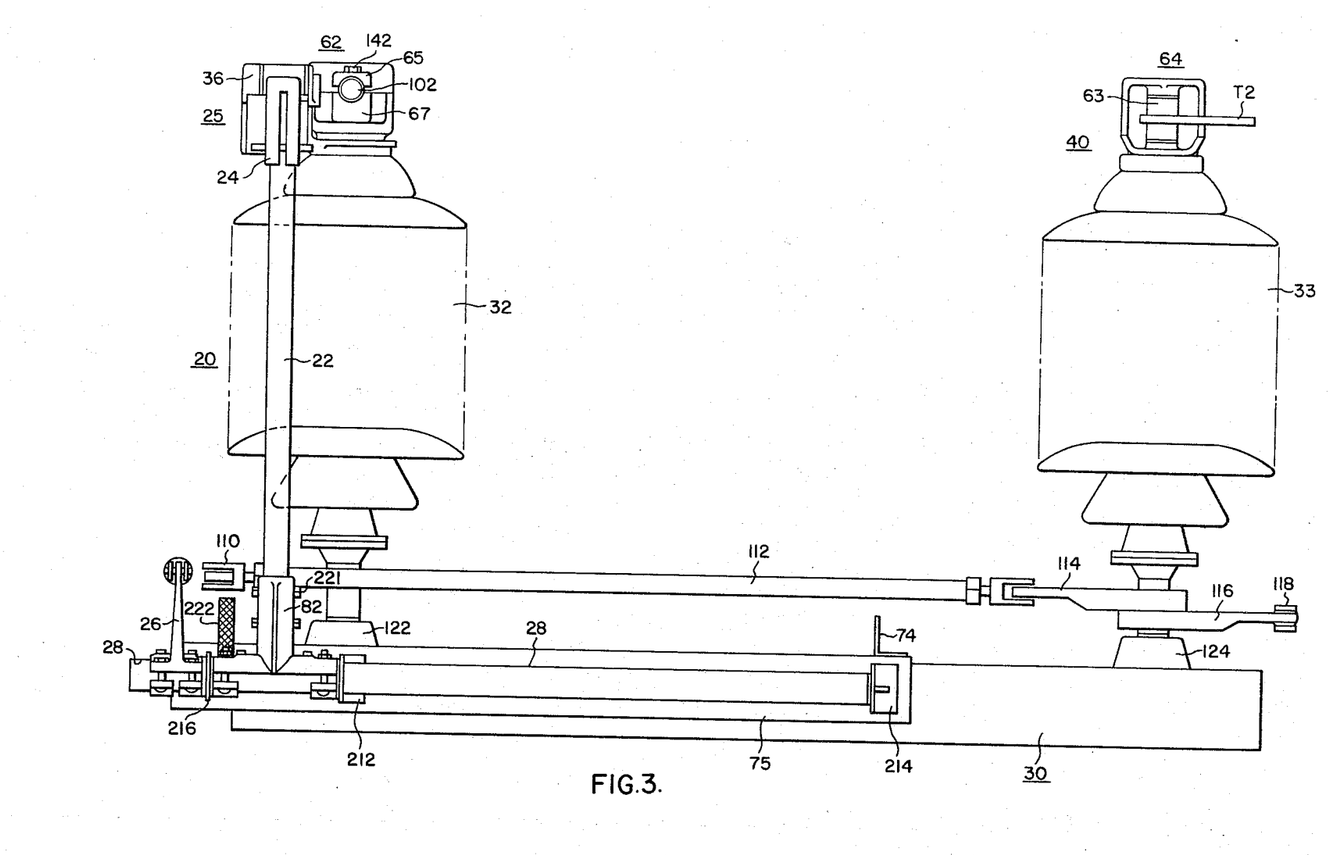
FIG. 3 is a view, in front elevation, of the grounding switch shown in FIGS. 1 and 2 mounted on a common supporting means with an associated high voltage disconnecting switch with the grounding switch shown in the closed position and the associated disconnecting switch shown in the open position.
Figure 4:
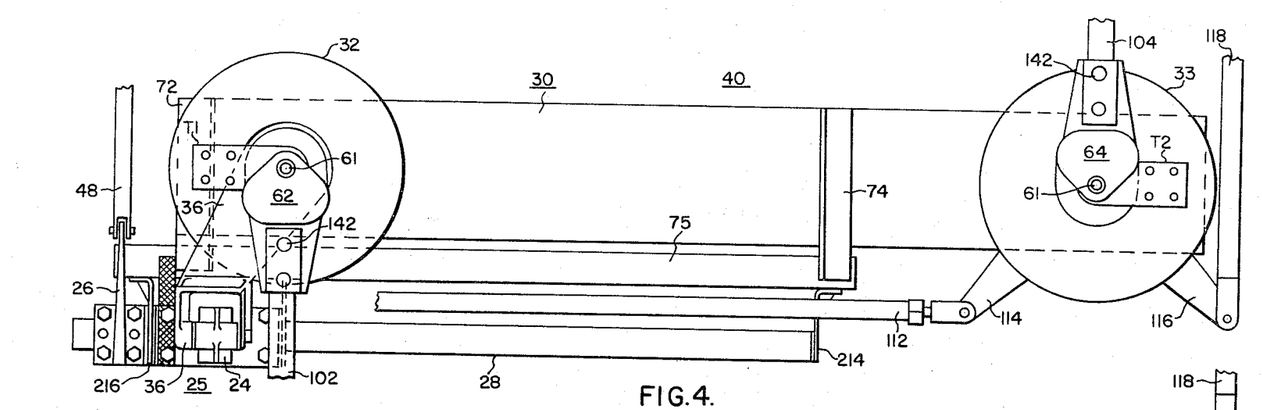
FIG. 4 is a plan view of the structure shown in FIG. 3 with the grounding switch shown in the closed position and the associated disconnecting switch in the open position.
Figure 5:
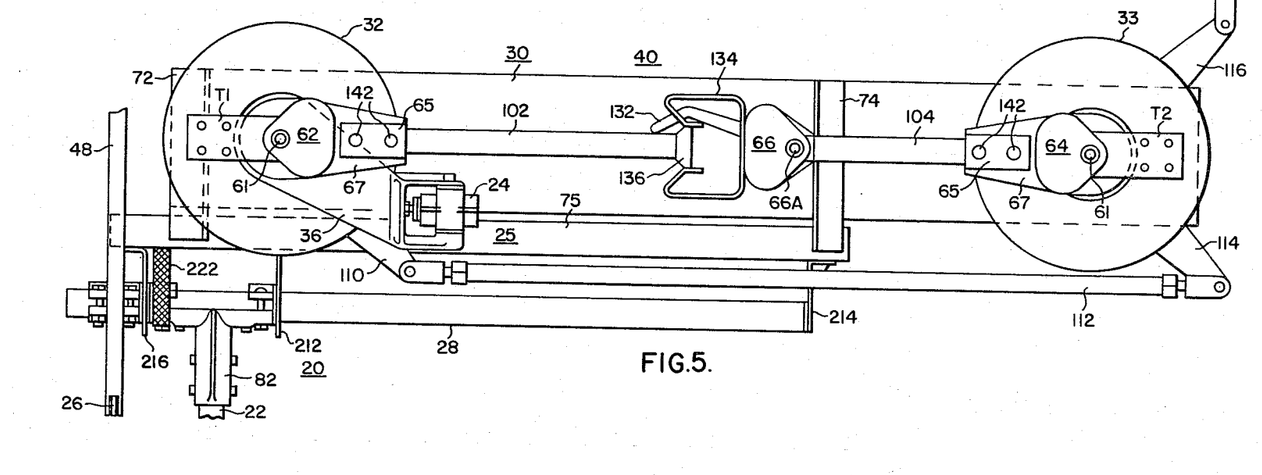
FIG. 5 is a plan view, similar to FIG. 4, showing the grounding switch in the open position and the associated disconnecting switch in the closed position.

As best shown in FIGS. 1, 3 and 5, the disconnecting switch assembly 40 comprises two spaced insulator stacks or insulating supports 32 and 33 which are both rotatably mounted or supported on a single or common elongated base member 30 by means of the supporting members 122 and 124, respectively. The base member 30 may be fabricated of galvanized steel in the form of a pair of spaced channel members which are both secured to other supporting members, as indicated at 34 in FIG. 1. The rotating or hinge contact assemblies 62 and 64 are rigidly secured to the upper ends of the insulator stacks 32 and 33, respectively, for rotation therewith. A rotatable switch blade or movable contact arm 102 having a contact 136 mounted at the free end thereof is secured to the contact hinge assembly 62 by any suitable means, such as the bolts 142, which fasten the switch blade 102 between an upper clamp 65 and a lower clamp 67 which is formed integrally with a conducting member that is rigidly secured to the insulator stack 32, as described in greater detail in our copending application previously mentioned. The hinge contact assembly 62 also includes the terminal member T1 which has a tubular portion 63 formed integrally therewith and is pivotally or rotatably supported by the generally U-shaped portion of the conducting member 67 which is secured to the upper end of the insulator stack 32 by a hinge pin 61, as best shown in FIGS. 1 and 4. Similarly, a rotatable switch blade or movable contact arm 104 having a hinge contact assembly 66 pivotally supported at the free end thereof is secured to the contact hinge assembly 64 by suitable means, such as the bolts 142, which fasten the switch blade 104 between an upper clamp 65 and a lower clamp 67 which is formed integrally as part of a conducting member that is rigidly secured to the upper end of the insulator stack 33. The hinge contact assembly 64 also includes a terminal member T2 which has a tubular portion formed integrally therewith and is pivotally supported on a U-shaped portion of the conducting member 67 by a hinge pin 61, similarly to the hinge contact assembly 62 previously described.

As best shown in FIG. 5, the hinge contact assembly 66 is pivotally supported at the free end of the switch blade 104 by means of a hinge pin 66A and includes a break contact jaw 134 which is generally U-shaped in configuration and includes a pair of opposed contact areas which are adapted to be engaged by the contact 136 at the free end of the switch blade 102 when the disconnecting switch 40 is in the closed position, as shown in FIG. 5. It is to be noted that the switch blade 104 and the hinge contact assembly 66 together form a toggle means which is straightened and collapsed during the opening and closing operations of the disconnecting switch 40, as described in detail in our copending application previously mentioned. The hinge contact assembly 66 also includes an impact arm 132 which engages the switch blade 102 during the closing of the disconnecting switch 40 to straighten the toggle means which includes the switch blade 104 and the hinge contact assembly 66 and to position the contact 136 between the opposite legs of the break contact jaw 134 which is formed of a conducting material having spring characteristics.

In order to actuate the disconnecting switch 40 between the open and closed positions, an operating mechanism may be provided which includes the lever arms 110 and 114 which are rigidly connected to the supporting members 122 and 124, respectively, at the lower end of the insulator stacks 32 and 33, respectively, as shown in FIGS. 3 and 5. The operating mechanism of the disconnecting switch 40 also includes an additional lever arm 116 which is rigidly secured to the supporting member 124 at the lower end of the insulator stack 33 and which is pivotally connected to an actuating or operating rod or shaft 118. The insulator stack 33 is operatively connected to the insulator stack 32 by means of a connecting rod 112 which is pivotally connected at one end to the lever arm 110 and is pivotally connected at the other end to the lever arm 114, as shown in FIG. 5. When the disconnecting switch 40 is to be opened, the actuating rod 118 is moved in a downward direction, as viewed in FIG. 5, by any suitable means (not shown) to actuate both the insulator stack 33 and the insulator stack 32 in a clockwise direction, as viewed in FIG. 5. The switch blades 102 and 104 then rotate in a clockwise direction with the respective insulator stacks to cause the switch blades 102 and 104 to swing in a substantially horizontal plane which is substantially perpendicular to the axis of each of the insulator stacks 32 and 33 to thereby actuate the contact 136 on the switch blade 102 to be disengaged from the break contact jaw 134. The switch blades 102 and 104 are further rotated until the switch blades 102 and 104 reach their final open positions which are substantially perpendicular to a line extending between the axes of the insulator stacks 32 and 33, as shown in FIG. 4. When the disconnecting switch 40 is to be actuated to a closed position from the open position shown in FIG. 4, the actuating rod 118 is moved in an upward direction, as viewed in FIG. 4, to rotate both the insulator stacks 32 and 33 in a counterclockwise direction, as viewed in FIG. 4, until the disconnecting switch 40 reaches the final closed position shown in FIG. 5.

It is to be noted that electric power conductors may be electrically connected to the terminal members T1 and T2 of the hinge contact assemblies 62 and 64, respectively, thereby completing an electrical circuit through the disconnecting switch 40 when the switch blades 102 and 104 are in their closed positions, as shown in FIG. 5. The electric circuit through the disconnecting switch 40 in its closed position extends from the terminal member T1, through the hinge pin 61, through the clamping members 65 and 67 of the hinge contact assembly 62 to the switch blade 102, through the contact 136, through the break contact jaw 134, of the hinge contact assembly 66, through the hinge pin 66a, through the other parts of the hinge contact assembly 66, through the switch blade 104, through the clamping members 65 and 67 of the hinge contact assembly 64, through the hinge pin 61 and finally to the terminal member T2. It is to be noted that, when the insulator stacks 32 and 33 are rotated along with the respective switch blades 102 and 104, the terminal members T1 and T2 which are pivotally supported on the hinge contact assembly 62 and 64 respectively remain in substantially the fixed positions shown in FIGS. 1 through 5 since the terminal members T1 and T2 are pivotally mounted on the respective hinge contact assemblies 62 and 64.

Figure 2:
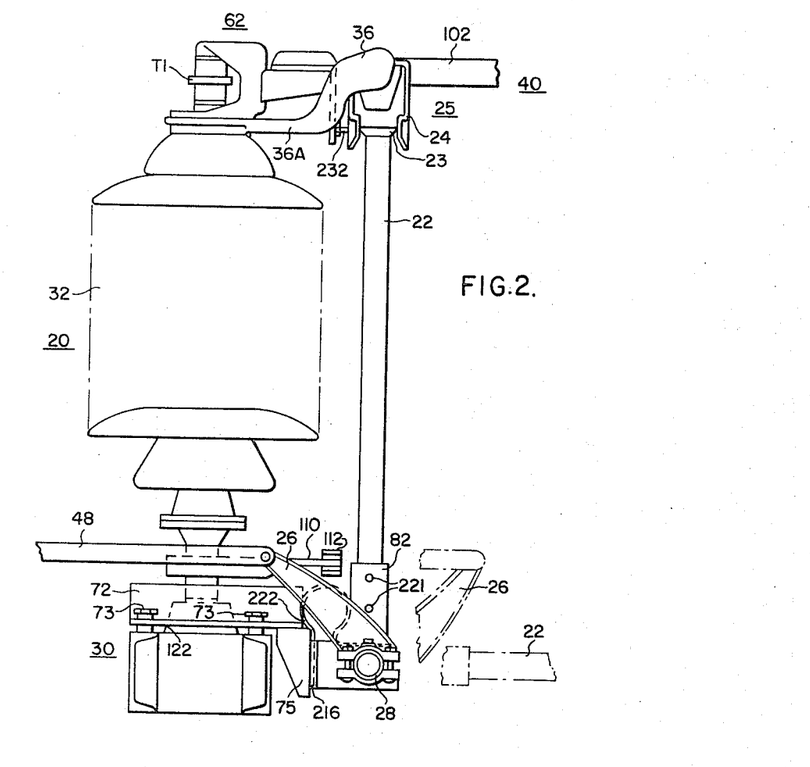
FIG. 2 is an enlarged view, in side elevation, of a portion of the grounding switch shown in FIG. 1 in the closed position.

Referring now to FIGS. 1, 2 and 3, the grounding switch 20, in general, comprises a rotatable switch blade or movable contact arm 22 which is disposed to engage a hinge contact assembly 25 which is supported by the insulator stack 32 which, in turn, as previously explained, is rotatably supported on the base 30. When the disconnecting switch 40 is in the open position, as shown in FIG. 4, the switch blade 22 may be employed for grounding a power circuit which is electrically connected to the terminal T1 by actuating the switch blade 22 to the closed position shown in FIG. 2. As shown, the blade 22 may be so mounted that it travels approximately 90° between the open position shown in FIG. 1, in which the blade is normally retained, and the closed position shown in FIG. 2.

In order to actuate the switch blade 22 between the open and closed positions of the grounding switch 20, a suitable operating mechanism may be provided as shown in FIG. 1. The operating mechanism may be manually operated by a handle 52 which is pivotally connected to a vertical shaft 44. The shaft 44 is rotatably mounted in the bearing supports 42 which may be attached to the same framework which supports the base 30, as indicated at 34 in FIG. 1. The shaft 44 is connected to one end of a horizontally disposed rod 48 through a crank arm 46. The other end of the rod 48 is pivotally connected to a lever arm 26 which in turn is secured to an operating shaft 28 on which the switch blade 22 is supported.

As shown by the dot-dash lines in FIG. 1, the handle 52 may be raised to a substantially horizontal position when it is desired to operate the operating mechanism of the grounding switch 20. The handle 52 is utilized to rotate the vertical shaft 44 thereby actuating the operating mechanism of the grounding switch 20, as will be described hereinafter. The handle 52 may be locked in the position shown by the full lines in FIG. 1 by means of a padlock (not shown).

Figures 11, 13:
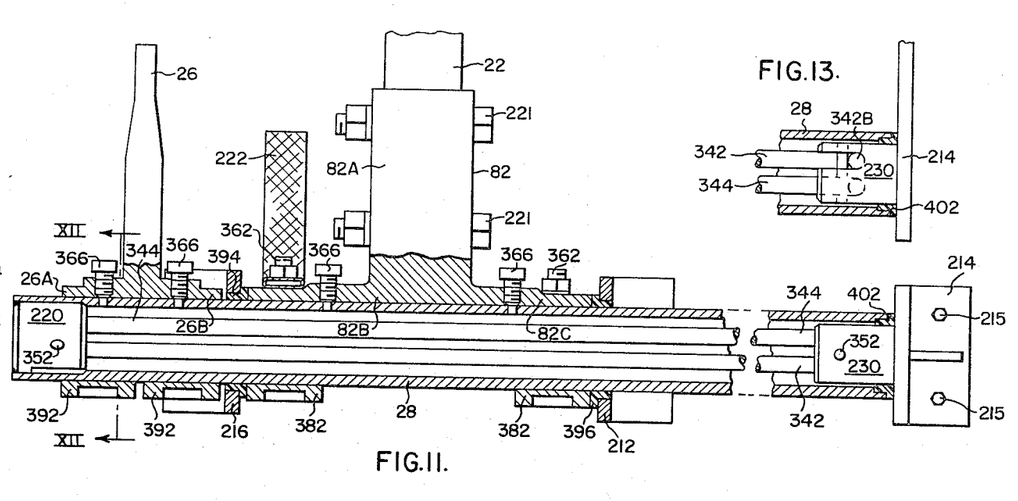
FIG. 11 is a front elevational view, partly in section, of a portion of the operating mechanism of the grounding switch shown in FIGS. 1 through 5.
FIG. 13 is a plan view of a portion of the operating mechanism shown in FIG. 11.
Figure 14:
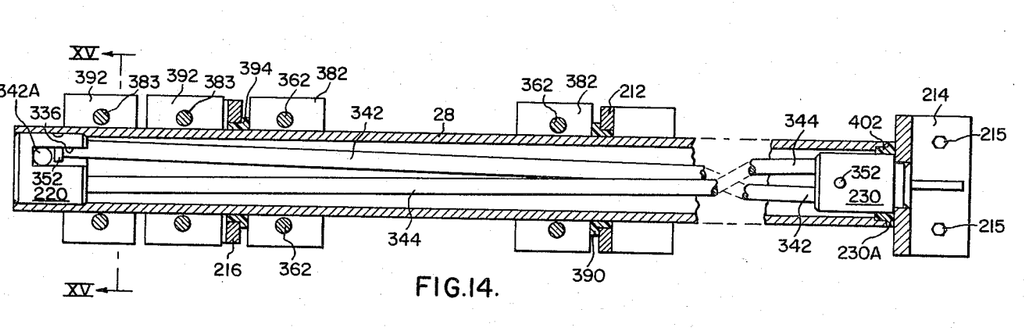
FIG. 14 is a front elevational view, partly in section, of the operating mechanism of the grounding switch shown in FIGS. 11 through 13 when the grounding switch is in the open position.

In order to rotatably support the operating shaft 28 of the grounding switch 20 for rotation about an axis which is substantially parallel to a line extending between the vertical axis of the insulator stacks 32 and 33, the bracket members 212, 214 and 216 are spaced along the operating shaft 28, as shown in FIGS. 5, 11 and 14. The bracket members 212, 214 and 216 are supported by and secured to an auxiliary base member 75 which, in turn, is supported by the spaced, angle-shaped bracket members 72 and 74 which project laterally from and are secured to the main base member 30 by suitable means, such as the bolts 73 shown in FIG. 1. Referring to FIG. 11, one end of the shaft 28 is supported by a ring-shaped bearing member 402 which may be formed from a suitable material, such as bronze, which is coated with a thin coating of a material having a low coefficient of friction, such as polytetrafluoroethylene. The bearing member 402 is supported in turn by the plug member 230 which includes a portion 230A that projects into an opening in the bracket member 214 and is rigidly secured to the bracket member 214 by any suitable means, such as welding. It is to be noted that the bracket member 214 may be secured or fastened to the auxiliary base member 75 by suitable means, such as the bolts 215, shown in FIGS. 11 and 14. The operating shaft 28 passes through aligned openings provided in the bracket members 216 and 212. The bearing members 394 and 396 are disposed in the openings of the bracket members 216 and 212, respectively, and may be formed from the same materials as previously indicated for the bearing member 402.

In order to support the switch blade 22 on the operating shaft 28, the conducting hinge member or blade supporting member 82 is secured to the shaft 28 adjacent to the insulator stack 32, as shown in FIGS. 5, 11 and 14. The hinge member 82 includes a tubular portion 82A which projects radially outwardly from the shaft 28 and is adapted to receive one end of the switch blade 22. The switch blade 22 is rigidly secured to the hinge member 82 by suitable means, such as the bolts 221, which pass through aligned openings in the hinge member 82 and the switch blade 22 through associated washers to engage the associated nuts. The hinge member 82 also includes the clamp portions 82B and 82C which are formed integrally with the hinge member 82 and which extend longitudinally along the shaft 28 in opposite directions from the tubular portion 82A of the hinge member 82, as shown in FIG. 11. The spaced saddle clamps 382 are provided on the opposite sides of the shaft 28 from the clamp portions 82B and 82C and are fastened to the clamp portions 82B and 82C by suitable means, such as the bolts 362, which pass through aligned openings in the clamps 382 and the associated clamp portions 82B and 82C through suitable washers to engage the associated nuts. In order to prevent rotation of the hinge member 82 with respect to the operating shaft 28, suitable means, such as the piercing screws 366 may be provided which pass through threaded openings in the hinge member 82 and project into aligned openings in the operating shaft 28, as best shown in FIG. 11.

In order to complete an electric circuit between the conducting hinge member 82 and a ground terminal provided on the auxiliary base member 75, a flexible conducting strap 222 is secured at one end to the conducting hinge member 82 by one or more of the bolts 362 which pass through the clamp portions of the conducting hinge member 82 and the associated clamps 382, as shown in FIGS. 2 and 11.

Figure 12:
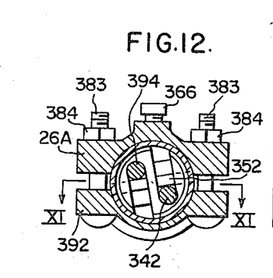
FIG. 12 is a side elevational view, in section, of the structure shown in FIG. 11, taken along the line XII—XII.
Figure 15:
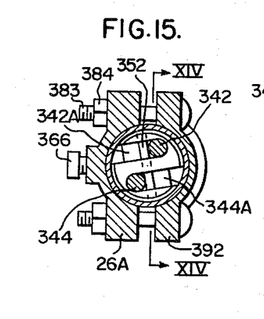
FIG. 15 is a side elevational view of the structure shown in FIG. 14, taken along the line XV—XV.

In order to secure the lever member 26 to the operating shaft 28 adjacent to one end of the shaft 28, the lever arm 26 includes the clamp portions 26A and 26B which extend longitudinally along the shaft 28 in opposite directions from the central portion of the lever arm 26, as best shown in FIG. 11. The spaced saddle clamps 392 are provided on the opposite side of the shaft 28 from the clamp portions 26A and 26B and are fastened to the clamp portions 26A and 26B by suitable means, such as the bolts 383, which pass through aligned openings in the clamp portions 26A and 26B and the associated clamps or yokes 392 to engage the associated nuts 384, as best shown in FIGS. 12 and 15. In order to prevent rotation of the lever arm 26 with respect to the operating shaft 28, suitable means such as the piercing screws 366 are provided which pass through threaded openings in the clamp portions of the lever member 26 and project through aligned openings provided in the tubular or hollow cylindrical operating shaft 28, as shown in FIG. 11.

When the operating shaft 28 is rotated by the operating mechanism of the grounding switch 180 as previously described, the switch blade 22 which is secured to the operating shaft 28 rotates between the open position shown in FIG. 1 and the closed position shown in FIG. 2 in a plane which is substantially perpendicular to the axis of the operating shaft 28 and which is substantially parallel and in this case spaced from the vertical axis of the adjacent insulator stack 32. When the associated disconnecting switch 40 is in the open position, as shown in FIGS. 2 and 5, the hinge contact assembly 25 is rotated to a position which lies in substantially the same plane in which the switch blade 22 rotates and is adapted to be engaged by the contact 23 which is supported at the free end of the switch blade 22.

Figure 6:
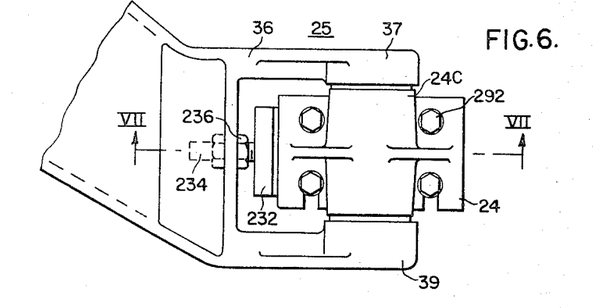
FIG. 6 is an enlarged view, in plan, of a portion of the contact structure of the grounding switch shown in FIGS. 1 through 5.
Figure 8:
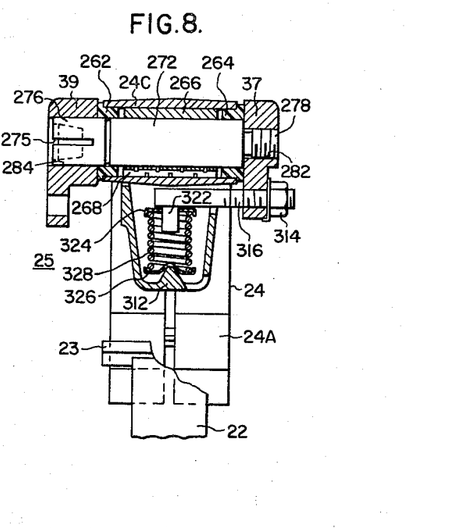
FIG. 8 is a side elevational view, in section, of the structure shown in FIGS. 6 and 7, taken along the line VIII—VIII in FIG. 7.
Figure 9:
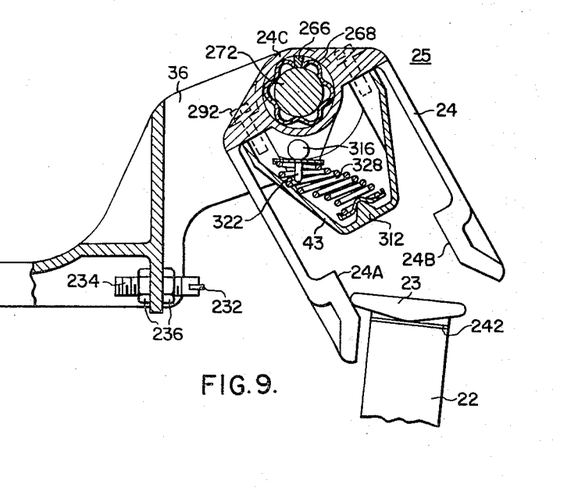
FIG. 9 is a view, similar to FIG. 7, showing the contacts of the grounding switch in a position corresponding to an intermediate operating position of the switch blade of the grounding switch.

In particular the hinge contact assembly 25, as shown in FIG. 2, includes a supporting member 36 which is formed from a conducting material, such as copper, and which includes a first portion 36A that is rigidly secured to the upper end of the insulator stack 32 by suitable means, such as bolts (not shown). The supporting member 36 includes a generally U-shaped portion which projects upwardly from the first portion 36A of the supporting member 36 and includes the spaced arms 37 and 39, as shown in FIG. 6, which are interconnected by a yoke portion 36B of the supporting member 36. The hinge contact assembly 25 also includes a break contact jaw 24 having an integral tubular portion 24C which is pivotally supported by a conducting hinge pin 272 for limited rotation about an axis which is substantially perpendicular to the plane in which the switch blade 22 rotates when the hinge contact assembly 25 is in the position which corresponds to the open position of the associated disconnecting switch 40, as indicated in FIGS. 4 and 8. The conducting hinge pin 272 is supported in turn by the spaced arms 37 and 39 of the supporting member 36, as best shown in FIG. 8. One end of the hinge pin 272 is of a reduced diameter, as indicated at 278 in FIG. 8, as is threaded to threadably engage a threaded opening 282 provided in the arm 37. The other end of the hinge pin 272 includes a tubular portion 276 having a tapered opening which is internally threaded to receive a threaded, tapered plug member 275 to force the tubular portion 276 which is slotted against the inner surface of an opening 284 provided in the arm 39 to insure an efficient electrical current transfer path between the hinge pin 272 and the arm 39. The spaced ring-shaped bearing members 262 and 264 are disposed between the hinge pin 272 and the opposite ends of the tubular portion 24C of the break contact jaw 24 and may be formed from the same materials as the bearing member 402 previously described. It is to be noted that since the outer diameter of the central portion of the hinge pin 272 is less than the inner diameter of the tubular portion 24C of the break contact jaw 24, an annular space is defined between the hinge pin 272 and the tubular portion 24C of the break contact jaw 24. In order to provide an efficient electrical current transfer path between the conducting hinge pin 272 and the tubular portion 24C of the break contact jaw 24, a resilient corrugated sheet-metal conducting sleeve 268 having a plurality of spaced slots is disposed within the annular space just described. The conducting sleeve 268 includes a plurality of alternate ridges and depressions which extend from one end to the other of the sleeve 268 to alternately engage the hinge pin 272 and the tubular portion 24C of the break contact jaw 24. As shown in FIGS. 8 and 9, the sleeve 268 is split longitudinally to provide two end portions that are biased apart by means of a conducting wedge member 266 that is driven between the end portions of the sleeve 268 to charge or stress the sleeve 268 so that the plurality of ridges will be alternately biased against the hinge pin 272 and the tubular portion 24C. The sleeve 268 is preferably formed from a material having a high electrical conductivity and suitable mechanical stiffness or spring characteristics such as a zirconium-copper alloy of the type sold under the trade name AMZIRC.

Figure 7:
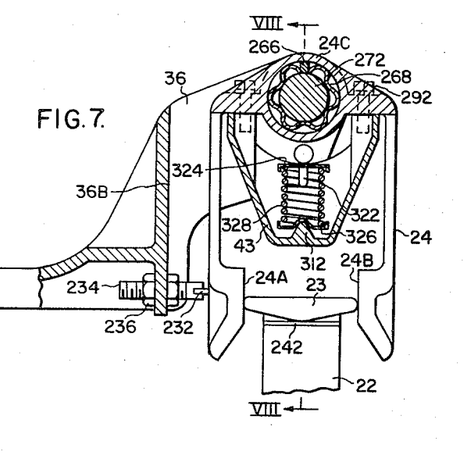
FIG. 7 is a front elevational view, in section, of the structure shown in FIG. 6, taken along the line VII—VII.

In order to limit the clockwise rotation of the break contact jaw 24, as viewed in FIG. 7, during the operation of the grounding switch 20, a stop member 232 is disposed adjacent to one of the sidewall portions of the break contact jaw 24, as best shown in FIGS. 6 and 7 to engage the break contact jaw 24 when the grounding switch 20 is in the closed position, as shown in FIG. 7. The stop member 232 is supported by and secured to a threaded stud member 234 which passes through and threadably engages a threaded opening provided in the yoke portion 36B of the supporting member 36, as shown in FIGS. 6 and 7. The adjusting nuts 236 are provided on the opposite sides of the yoke portion 36B to adjust the position of the stop member 232 relative to the break contact jaw 24.

In order to bias the break contact jaws 24 to a position, as indicated in FIG. 9, adapted to receive the contact 23, which is supported at the free end of the switch blade 22, when the grounding switch is in the open position, the hinge contact assembly 25 includes the compression spring 328, as shown in FIGS. 7, 8 and 9, which is disposed between the spaced spring seat members 324 and 326 which are disposed between the sidewall portions of the break contact jaw 24. The upper spring seat 324 is supported by a threaded stud member 316, which includes a downwardly projecting portion 322 that projects inside the upper end of the spring 328, and is supported, in turn, by the arm 37 of the supporting member 36. The arm 37 includes a threaded opening through which the stud 316 passes and which is threadably engaged by the stud 316. A nut 314 is provided on the outer end of the stud 316 to assist in properly positioning the stud when the hinge contact assembly is manufactured or assembled. The lower spring seat 326 is supported by a projecting portion 312 which engages a recess provided in the spring seat 326 and is formed integrally with a generally cup-shaped shielding member 43 which is secured to the underside of the bight portion of the break contact jaw 24 on opposite sides of the tubular portion 24C by suitable means, such as the bolts 292. The shielding member 43 also performs the important function of preventing the formation of ice upon the compression spring 328 and the associated parts which might inhibit or prevent a proper operation of the grounding switch 20.

In the operation of the hinge contact assembly 25, when the grounding switch is in the closed position with the contact 23 of the upper end of the switch blade 22 engaging the first and second, spaced planar contact areas or surfaces 24A and 24B, respectively, provided on the spaced sidewall portions of the break contact jaw 24, the compression spring 328 is positioned to apply a substantially downward biasing force on the shielding member 43 which passes through the axis of the hinge pin 272 and therefore, has substantially no effect on the hinge contact assembly 25 in the operating position shown in FIG. 7. When the switch blade 22 is actuated in a clockwise direction as viewed in FIG. 7 during an opening operation of the grounding switch 20, the contact 23 which engages or bears against the contact areas 24A and 24B of the break contact jaw 24 in first and second spaced line contacts will actuate the break contact jaw in a counterclockwise direction, as viewed in FIG. 7, about the hinge pin 272 until the line of action of the force exerted by the compression spring 328 changes suddenly to bias the break contact jaw 24 in a counterclockwise direction about the hinge pin 272, as the contact 23 moves further in a clockwise direction, as viewed in FIG. 9, to a final position which is determined by the stud 316 acting as a stop member. In acting as a stop, the stud 316 bears against an inner web portion provided on the shielding member 43 to limit the counterclockwise rotation of the break jaw member 24 to a position which is angularly displaced from the position shown in FIG. 7 by a predetermined angle of substantially 30° about the hinge pin 272. When the switch blade 22 is rotated in a counterclockwise direction, as viewed in FIG. 9, the contact 23 will engage one of the planar contact areas 24A and rotate the break contact jaw 24 in a clockwise direction until the break contact jaw 24 reaches its final position, as shown in FIG. 7, which is determined by the position of the stop member 232, as previously explained.

In order to obtain efficient current transfer between the switch blade 22 and the break contact jaw 24, the planar contact areas 24A and 24B of the break contact jaw 24 should be rotated to final positions, when the disconnecting switch 40 is actuated to the open position, which are substantially perpendicular to the plane in which the switch blade 22 rotates. This is so that the lateral edges of the contact 23, which includes an upper portion that is substantially rectangular, will engage the contact areas 24A and 24B in the engaged position of the grounding switch 20, as shown in FIG. 7, in first and second line contacts which are substantially perpendicular to the plane in which the switch blade 22 rotates. If the hinge contact assembly 25 which includes the break contact jaw 24 is actuated to a position in which the planar contact areas 24A and 24B are not precisely perpendicular to the plane in which the switch blade 22 rotates and if the contact 23 were rigidly secured to the switch blade 22, then the possibility of damage to the break jaw 24 or the contact 23 on the switch blade 22 would result or the current transfer path provided would be less efficient than that which is desired or required.

Figure 10:
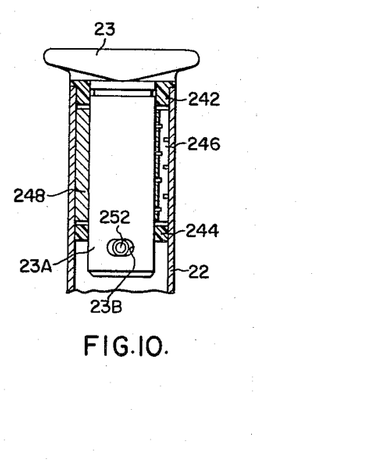
FIG. 10 is an elevational view, partly in section, of the free end of the switch blade of the grounding switch shown in FIGS. 1 through 5.

In order to compensate for any limited misalignment between the break contact jaw 24 and the contact 23 disposed at the free end of the switch blade 22, the contact 23 is pivotally supported at the free end of the switch blade 22 for limited rotation with respect to the switch blade 22 to permit the desired alignment between the contact 23 and the planar contact areas 24A and 24B of the break contact jaw 24. As best shown in FIG. 10, the contact 23 includes a cylindrical portion 23A which projects into the hollow, upper, free end of the switch blade 22 with the spaced, ring-shaped bearing members 242 and 244 being disposed between the switch blade 22 and the cylindrical portion 23A of the contact 23 as shown in FIG. 10. In order to limit the rotation of the contact 23 with respect to the switch blade 22, a retaining pin 252 is disposed to pass through aligned openings in the switch blade 22 and a last motion slot 23B is provided at the lower end of the cylindrical portion 23A of the contact 23, as shown in FIG. 10. The size of the slot 23B determines the angular limits of the rotation of the contact 23 with respect to the switch blade 22. In order to provide efficient current transfer between the switch blade 22 and the contact 23, the flexible corrugated sheet-metal sleeve 246 is disposed in the annular space defined between the cylindrical portion 23A of the contact 23 and the switch blade 22. Similarly to the sleeve 268 previously described, the corrugated sleeve 246 includes a plurality of alternate ridges and depressions which alternately engage the cylindrical portion 23A and the switch blade 22 and which extend longitudinally of the sleeve 246. The sleeve 246 may also be split longitudinally similarly to the sleeve 268 with a conducting wedge member 248 disposed between the ends of the sleeve 246 to charge or stress the ridge portions of the sleeve 246 into better contact making engagement with the cylindrical portion 23A and the switch blade 22. When the hinge contact assembly 25 is rotated substantially into the plane in which the switch blade 22 rotates the slot 23B will permit a limited angular deviation of the position of the hinge contact assembly from the plane in which the switch blade rotates. For example, the size of the slot 23B may be designed to permit a 5° deviation in either direction of the position of the hinge contact assembly 25 from the plane in which the switch blade 22 rotates or to permit a 5° deviation of the final positions of the planar contact areas 24A and 24B from a position which is precisely perpendicular to the plane in which the switch blade 22 rotates. In other words, even if the hinge contact assembly 25 is not actuated precisely to the final preferred position during the opening of the disconnecting switch 40, the contact 23 provided at the free end of the switch blade 22 will still engage the contact areas of the break contact jaw 24 with the desired first and second line contacts for a limited angular deviation of the final position of the hinge contact assembly 25 from the preferred position. It is to be noted that the bearing members 242 and 244 may be formed from the same materials as previously described for the bearing member 402 and that the corrugated sleeve 246 may be formed from the same type of conducting material as previously described for the corrugated sleeve 268.

In order to at least partially counter-balance the weight of the switch blade 22 during the opening and closing operations of the grounding switch 20, one or more torsion bar spring members, such as the torsion bars 342 and 344 shown in FIGS. 11 through 15, may be disposed inside the tubular operating shaft 28. In general, one end or portion of each of the torsion bars 342 and 344 is secured to the bracket member 214 through the plug member 230 to substantially prevent rotation of one end or portion of each of said torsion bars when the operating shaft 28 is rotated, while another spaced end or portion of each of said torsion bars is secured to the operating shaft 28 for rotation therewith during the opening and closing of the grounding switch 20. The torsion bars 342 and 344 are thus resiliently stressed or twisted within the elastic limit of the material from which the torsion bars 342 and 344 are formed to exert a torque or force on the operating shaft 28 which is opposite in direction or effect from that of the gravitational force exerted on the operating shaft 28 by the weight of the switch blade 22 during at least certain portions of the travel of the switch blade 22.

Figure 16:
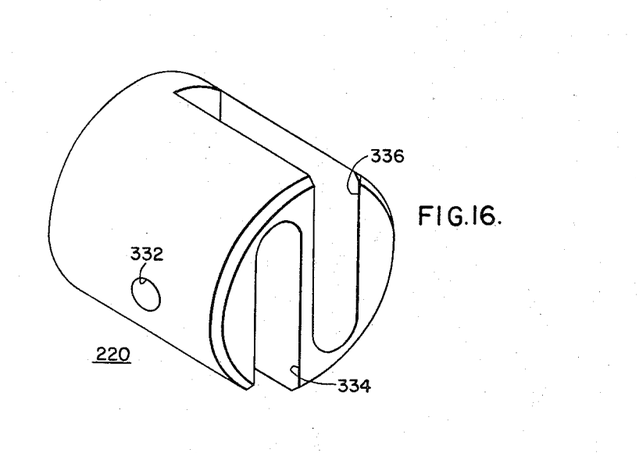
FIG. 16 is an isometric view of a portion of the operating mechanism shown in FIGS. 11 through 15.

In particular, the plug member 220 which is disposed inside the operating shaft 28 at the left end of the shaft 28 is secured to the shaft 28 by any suitable means, such as welding. The plug member 220, as shown in FIG. 16, includes two longitudinally extending, substantially parallel, spaced slots 334 and 336 which are adapted to receive the adjacent ends of the respective torsion bars 344 and 342 as shown in FIG. 14. The end of the torsion bar 342 which is disposed in the slot 336 of the plug member 220 is turned or bent at substantially a right angle while the adjacent end of the torsion bar 344 is also turned or bent at substantially a right angle, as indicated at 344A in FIG. 15 with the bent ends of the torsion bars 342 and 344 being retained within the slots 336 and 334, respectively, of the plug member 220 by a retaining pin 352 which passes through aligned openings in the different portions of the plug member 220 when the torsion bars 342 and 344 are assembled with the plug member 220. Similarly, the plug member 230 includes first and second longitudinally extending slots identical with those provided in the plug member 220 to receive the bent ends 342B and 344B at the other ends of the respective torsion bars 342 and 344 which are retained in position by a retaining pin 352.

The assembled positions of the torsion bars 342 and 344 and the associated plug members 220 and 230 with respect to the operating shaft 28 and the bracket member 214 determine the stressed or unstressed condition of said torsion bars, considered as springs, in the different operating positions of the grounding switch 20. For example, when the switch blade 22 is in the closed position of the grounding switch 20, as shown in FIG. 2, the torque arm of the gravitational force acting on the operating shaft 28 due to the weight of the switch blade 22 is substantially negligible and the torsion bars 342 and 344 may be disposed so that the torsion bars 342 and 344 are substantially unstressed or uncharged in the position of the switch blade 22 shown in FIG. 2 and to be gradually stressed to an increasing value, as the switch blade 22 is actuated to the open position shown in FIG. 1 of the drawings to substantially counter-balance or compensate the operating mechanism of the grounding switch 20 for the weight of the switch blade 22 and to substantially reduce the operating forces required to actuate the operation of the grounding switch between the open and closed positions.

Assuming that the torsion bars 342 and 344 are substantially unstressed in the operating position of the switch blade 22 as shown in FIG. 2, the torsion bars 342 and 344 will be resiliently twisted or stressed in an increasing manner until the switch blade 22 reaches its final open position which corresponds to the operating position of the torsion bars 342 and 344, shown in FIGS. 14 and 15 with the torsion bars 342 and 344 exerting a torque or force on the operating shaft 28 which is substantially equal and opposite to the force exerted on the operating shaft 28 due to the weight of the switch blade 22 in the open position shown in FIG. 1. It is to be noted that the torsion bars 342 and 344 may be positioned or disposed within the operating shaft 28 so that in the operating position of the switch blade 22 shown in FIG. 2, the torsion bars 342 and 344 will be stressed by a predetermined amount to exert a torque on the operating shaft 28 which will bias the switch blade 22 in a clockwise direction, as viewed in FIG. 2, to retain the switch blade 22 in the closed position of the grounding switch 20, as shown in FIG. 2.

It is important to note that the opposite ends or portions of the torsion bars 342 and 344 are not rigidly secured to the shaft 28 or to the bracket member 214 through the associated plug members but are simply retained or captured at the spaced ends or portions of the respective torsion bars to prevent the concentration of mechanical stress at the ends of said torsion bars and to distribute the stress along the length of each of said torsion bars, which function effectively as stored energy devices, such as springs, in the disclosed construction.

It is to be noted that the retaining pin 352 provided in each of the plug members 220 and 230 may be assembled through aligned openings in the operating shaft 28 to precisely position the plug member 220 prior to the securing of the plug member 220 to the operating shaft 28 by a suitable means, such as welding. It will also be noted that the ends of the torsion bars 342 and 344 which are secured to the left end of the shaft 28 through the plug member 220 are rotated substantially 90° during the rotation of the switch blade 22 and the operating shaft 28 between the open and closed positions of the grounding switch 20, as shown in FIGS. 1 and 2, respectively. In other words, the ends of the torsion bars 342 and 344 which are substantially prevented from rotating with the shaft 28 during the opening and closing positions of the grounding switch 20 remain in the same relative positions, as indicated in FIGS. 11, 13 and 14, with the positions of the torsion bars 342 and 344 in the closed positions of the grounding switch 20 being illustrated in FIGS. 11 and 13, and the positions of said torsion bars in the open position of the grounding switch 20 being illustrated in FIGS. 14 and 15. On the other hand, the relative positions of the torsion bars 342 and 344 at the ends which are secured for rotation to the shaft 28 at the left end of the shaft by the plug member 220 substantially reversed their relative positions in a vertical sense as viewed in FIGS. 11 and 14.

It is to be understood that the teachings of this invention with respect to certain features may be applied to a grounding switch in which a switch blade engages a relatively stationary contact member rather than a rotatable contact member as illustrated in the drawings. For example, the switch blade of a grounding switch may be at least partially counterbalanced by the disclosed construction even though the contact member engaged by the switch blade does not rotate into a position to receive the switch blade as in the disclosed construction. It is also to be understood that the teachings of the invention may be applied either to a single pole switch or to a three phase or polyphase switch which may be actuated by a common operating mechanism by extending the operating rod 48 shown in FIG. 1 to spaced pole units of a like construction.

The apparatus embodying the teachings of this invention has several advantages. For example, the counterbalancing means, more specifically one or more torsion bars, disclosed for reducing the operating forces required to actuate the disclosed grounding switch is effectively shielded from the formation of ice which might inhibit or prevent the proper operation of the grounding switch, since the torsion bars as disclosed are disposed inside a tubular operating shaft which effectively functions as an ice shielding member in addition to its other functions. In addition, the disclosed grounding switch construction is particularly adapted for use with a high voltage disconnecting switch of the center break type since the contact provided on the switch blade of the disclosed construction is permitted to rotate within predetermined limits in place to compensate for any misalignment or deviation from the desired operating position of the associated hinge contact assembly, when the associated high voltage disconnecting switch is actuated to the open position, to thus insure a more efficient current transfer between the switch blade and the associated contact assembly and to avoid possible damage to the different portions of the grounding switch, as disclosed. The positive engagement of the contact provided on the switch blade of the disclosed construction also insures at least first and second line contacts between the contact provided on the switch blade and the associated hinge contact assembly in the disclosed construction.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A switch comprising a tubular shaft, a frame for rotatably supporting the shaft about a substantially horizontal axis, a switch blade secured to the shaft and rotatable with the shaft in substantially a predetermined plane between a substantially horizontal position and a substantially vertical position, a contact supported on an insulator and spaced from and above said shaft, said contact being disposed in at least one operating position in substantially said first plane to be engaged by and disengaged from one end of the switch blade, one or more torsion bars disposed inside the shaft, each torsion bar having one end secured to the frame and having the other end secured to the shaft, and means directly coupled to the shaft for rotating the shaft to actuate the switch blade between said positions, said one or more torsion bars being twisted during the movement of the shaft to compensate for at least part of the weight of the switch blade during at least certain portions of the movement of the shaft.

2. A switch comprising a tubular shaft, a frame for rotatably supporting the shaft about a substantially horizontal axis, a switch blade secured to the shaft and rotatable with the shaft in substantially a predetermined plane between a substantially horizontal position and a substantially vertical position, a contact supported on an insulator and spaced from and above said shaft, said contact being disposed in at least one operating position in substantially said first plane to be engaged by and disengaged from one end of the switch blade, one or more torsion bars disposed inside the shaft, each torsion bar having one end secured to the frame and having the other end secured to the shaft, and means directly coupled to the shaft for rotating the shaft to actuate the switch blade between said positions, said one or more torsion bars being twisted during the movement of the shaft to substantially compensate for the weight of the switch blade during at least certain portions of the movement of the shaft, and to bias said one end of the switch blade into engagement with the first contact when the shaft rotates the switch blade into engagement with the first contact.

3. A switch structure comprising first and second spaced, substantially parallel insulator stacks each rotatable about its own axis, a switch blade mounted on each insulator stack for rotation therewith in a first plane which is substantially perpendicular to the axis of the associated stack to engage and disengage the other switch blade, a contact member mounted on one of said insulator stacks for rotation therewith from a first position when said switch blades are engaged to a second position when said switch blades are disengaged, a hollow shaft spaced from and substantially parallel to said first plane, a frame for rotatably supporting the shaft, an additional switch blade secured to the shaft and movable into and out of engagement with the contact member in its second position, one or more torsion bars disposed inside the shaft, each bar having a first portion secured to the frame and a second portion spaced from the first portion and secured to the shaft for rotation therewith, said one or more torsion bars each being resiliently stressed during at least predetermined portions of the movement of the shaft to substantially counterbalance the weight of the additional switch blade.

4. A switch structure comprising first and second spaced, substantially parallel insulator stacks each rotatable about its own axis, a switch blade mounted on each insulator stack for rotation therewith in a first plane which is substantially perpendicular to the axis of the associated stack to engage and disengage the other switch blade, a contact member mounted on one of said insulator stacks for rotation therewith from a first position when said switch blades are engaged to a second position when said switch blades are disengaged, a rotatable shaft spaced from and disposed substantially parallel to said first plane, an additional switch blade secured to the shaft and movable in an arc in a second plane to engage and disengage the contact member in its second position, and an additional contact member mounted at one end of the additional switch blade for limited rotation with respect to the additional switch blade to substantially compensate for misalignment between the first mentioned contact member and the additional contact member when the second position of the first mentioned contact member deviates from the second plane in which the additional switch blade moves.

5. A switch structure comprising a pair of spaced, substantially parallel insulator stacks each rotatable about its own axis, a pair of switch blades mounted on the respective insulator stacks for rotation therewith in a first plane which is substantially perpendicular to the axes of the insulator stacks to engage and disengage, a contact member mounted on one of the insulator stacks for rotation therewith from a first position when the switch blades are engaged to a second position when the switch blades are disengaged, a hollow shaft disposed substantially parallel to a line extending between the axis of the insulator stacks, a frame for rotatably supporting the shaft, an additional switch blade secured to the shaft and rotatable into and out of engagement with the contact member in its second position, one or more torsion bars disposed inside the shaft, each bar having a first portion secured to the frame to prevent the rotation of the first portion with respect to the frame and a second portion secured to the shaft for rotation with the shaft, said one or more torsion bars each being stressed within its elastic limit during the rotation of the shaft to substantially compensate for the weight of the switch blade during at least certain portions of the movement of the shaft.

References Cited by the Examiner
UNITED STATES PATENTS

| 2,420,485 | 5/1947 | Kast | 200—48 X |
| 2,605,370 | 7/1952 | Leopold | 200—48 |
| 2,676,216 | 4/1954 | Zeth | 200—48 |

References Cited by the Applicant
UNITED STATES PATENTS

| 2,757,255 | 7/1956 | Owens et al. |
| 3,024,328 | 3/1962 | Burdeshaw. |
| 3,089,006 | 5/1963 | Thallner. |

ROBERT K. SCHAEFER, *Primary Examiner.*

H. J. HOHAUSER, *Assistant Examiner.*